US008036843B2

(12) United States Patent
Pierce

(10) Patent No.: US 8,036,843 B2
(45) Date of Patent: *Oct. 11, 2011

(54) COMPUTER READABLE MEDIUM AND METHOD OF IMPROVING RAS CHARACTERISTICS RELATING TO CALIBRATION ALGORITHMS IN AN AUTOMATED ROBOTIC SYSTEM

(75) Inventor: Steven N. Pierce, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 12/257,354

(22) Filed: Oct. 23, 2008

(65) Prior Publication Data

US 2009/0088998 A1    Apr. 2, 2009

Related U.S. Application Data

(63) Continuation of application No. 11/281,634, filed on Nov. 17, 2005, now Pat. No. 7,472,029.

(51) Int. Cl.
*G01D 18/00* (2006.01)
(52) U.S. Cl. ............ 702/85; 702/94; 702/104; 702/105
(58) Field of Classification Search .................... 901/46, 901/50; 702/85, 94, 104, 105; 700/57, 64, 700/245; 235/383, 385
See application file for complete search history.

(56) References Cited

U.S. PATENT DOCUMENTS

| | | | |
|---|---|---|---|
| 5,303,034 A | 4/1994 | Carmichael et al. | |
| 5,613,154 A | 3/1997 | Burke et al. | |
| 5,742,699 A | 4/1998 | Adkins et al. | |
| 6,826,453 B1 | 11/2004 | Grasso et al. | |
| 6,922,632 B2 | 7/2005 | Foxlin | |
| 7,047,106 B2 | 5/2006 | Butka et al. | |
| 7,117,068 B2 | 10/2006 | Critchlow | |
| 7,472,029 B2 * | 12/2008 | Pierce | 702/85 |
| 2003/0053715 A1 | 3/2003 | Chamberlain | |
| 2004/0236465 A1 | 11/2004 | Butka et al. | |
| 2005/0080512 A1 | 4/2005 | Critchlow | |
| 2007/0046941 A1 | 3/2007 | Mestha et al. | |

OTHER PUBLICATIONS

P. Abbott et al., "Measuring the Tilt of a Robot in an Automated Tape Library", IBM Techical Disclosure Bulletin, vol. 36, No. 7, Jul. 18, 2005, pp. 475-476.
Amendment 1, Nov. 27, 2007, for U.S. Appl. No. 11/281,634, Total 11 pp.
Amendment 2, Mar. 7, 2008, for U.S. Appl. No. 11/281,634, Total 4 pp.

(Continued)

*Primary Examiner* — Mohamed Charioui
*Assistant Examiner* — Elias Desta
(74) *Attorney, Agent, or Firm* — David W. Victor; Konrad Raynes & Victor LLP

(57) ABSTRACT

An automated data library system employs a calibration sensor, the fiducial target and a controller in electrical communication with the calibration sensor to create a calibration sensor pixel image of a calibration area surrounding an expected location of the fiducial target within the automated data storage library by executing one or more vertical calibration sensor scans and/or one or more horizontal calibration sensor scans of the calibration area, and monitoring an output of the calibration sensor scans at defined position intervals. The expected location of the fiducial target can be on a data storage drive of the library or a storage shelf of the library. The controller can execute a debugging procedure, a diagnostic test and/or an error recovery procedure based on the calibration sensor pixel image.

6 Claims, 15 Drawing Sheets

OTHER PUBLICATIONS

Final Office Action 1, Feb. 22, 2008, for U.S. Appl. No. 11/281,634, Total 26 pp.

Notice of Allowance 1, Apr. 14, 2008, for U.S. Appl. No. 11/281,634, Total 26 pp.

Notice of Allowance 2, Aug. 7, 2008, for U.S. Appl. No. 11/281,634, Total 10 pp.

Office Action 1, Oct. 26, 2007, for U.S. Appl. No. 11/281,634, Total 14 pp.

Siegl, H., C. Stock, and A. Pinz, "Deliverable D.4.2: Design of a Visual Human-Computer Interface Using AR Features", Jun. 4, 2003, BU PUblication, Total 7 pp.

* cited by examiner

COMPUTER READABLE MEDIUM AND METHOD OF IMPROVING RAS CHARACTERISTICS RELATING TO CALIBRATION ALGORITHMS IN AN AUTOMATED ROBOTIC SYSTEM

RELATED APPLICATION

This application is a continuation of U.S. patent application Ser. No. 11/281,634, filed on Nov. 17, 2005, which patent application is incorporated herein by reference in its entirety.

FIELD OF THE INVENTION

This invention relates to automated data storage libraries, and more particularly, to an automated data storage library employing a calibration sensor on a moving accessor in order to get accurate X and Y position information from fiducial targets places at various locations and to confirm the physical presence of other objects.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and Y directions. As such, it is important that accessors have the capability of being able to accurately locate storage shelves and data storage drives.

Fiducial (calibration) targets are provided within a library to align the storage shelves and data storage drives with the accessor. There is often difficulty in debugging field problems when a fiducial target cannot be found at an expected location in the library. These types of errors can be caused by a variety of reasons, including firmware or mechanical causes. As an example, if the accessor is searching for a fiducial target with its calibration sensor and cannot find it in the expected location, then the library calibration process will fail. When debugging this event from logged library event data, it doesn't provide a picture of where the calibration sensor was searching relative to the physical location of the fiducial target. All that is known is the absolute location at which the sensor was searching.

One solution to this problem would be to have a camera that would take a picture of the area in question. However, drawbacks to this solution are that it adds additional cost related to the incorporation of the camera into the accessor, requires additional firmware and hardware be added to the accessor, requires additional processor and network bandwidth in operation, and has a limited availability on existing library systems. The challenge therefore is to provide a better solution in handling library calibration errors that result in a fiducial target not being in an expected location.

SUMMARY OF THE INVENTION

The present invention provides a new and unique method of creating a low resolution image of an area surrounding an expected location of a fiducial target in question as seen by a calibration sensor.

One form of the present invention is a signal bearing medium tangibly embodying a program of machine-readable instructions executed by a processor to perform operations comprising an identification of a calibration area surrounding an expected location of a fiducial target within an automated data storage library and a creation of a calibration sensor pixel image of the calibration area.

A second form of the present invention is a controller of an automated data storage library. The controller comprises a processor and a memory storing instructions operable within the processor, the instructions being executed for identifying a calibration area surrounding an expected location of a fiducial target within an automated data storage library, and for creating a calibration sensor pixel image of the calibration area.

A third form of the present invention is an automated data storage library comprising a calibration sensor, a fiducial target, and a controller in electrical communication with the calibration sensor to create a calibration sensor pixel image of a calibration area surrounding an expected location of the fiducial target within the automated data storage library.

The forgoing forms and other forms as well as objects, features and advantages of the present invention will become further apparent from the following detailed description of the various embodiments of the present invention, read in conjunction with the accompanying drawings. The detailed description and drawings are merely illustrative of the present invention rather than limiting, the scope of the present invention being defined by the appended claims and equivalents thereof.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
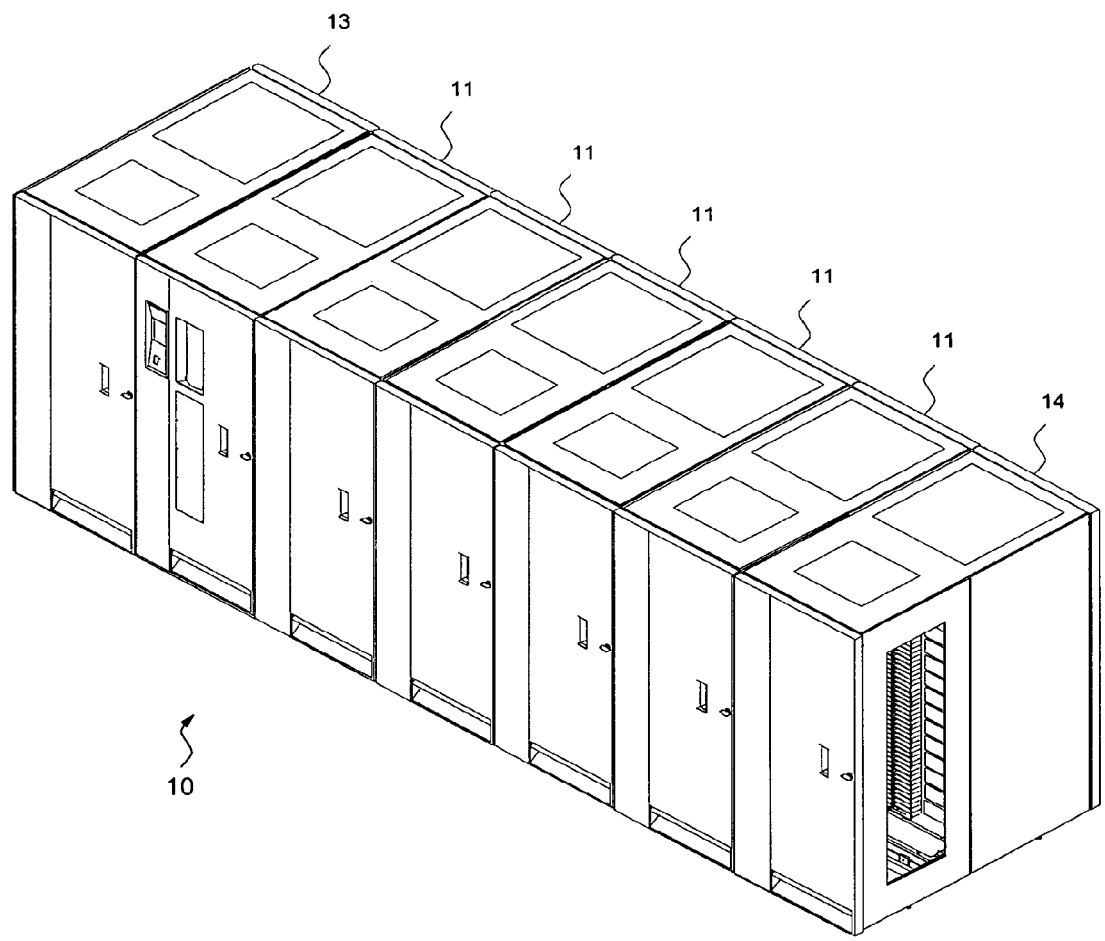
FIG. 1 illustrates an isometric view of an automated data storage library adaptable to implement an embodiment of the present invention, with the view specifically depicting a library having a left hand service bay, multiple storage frames and a right hand service bay.
Figure 2:
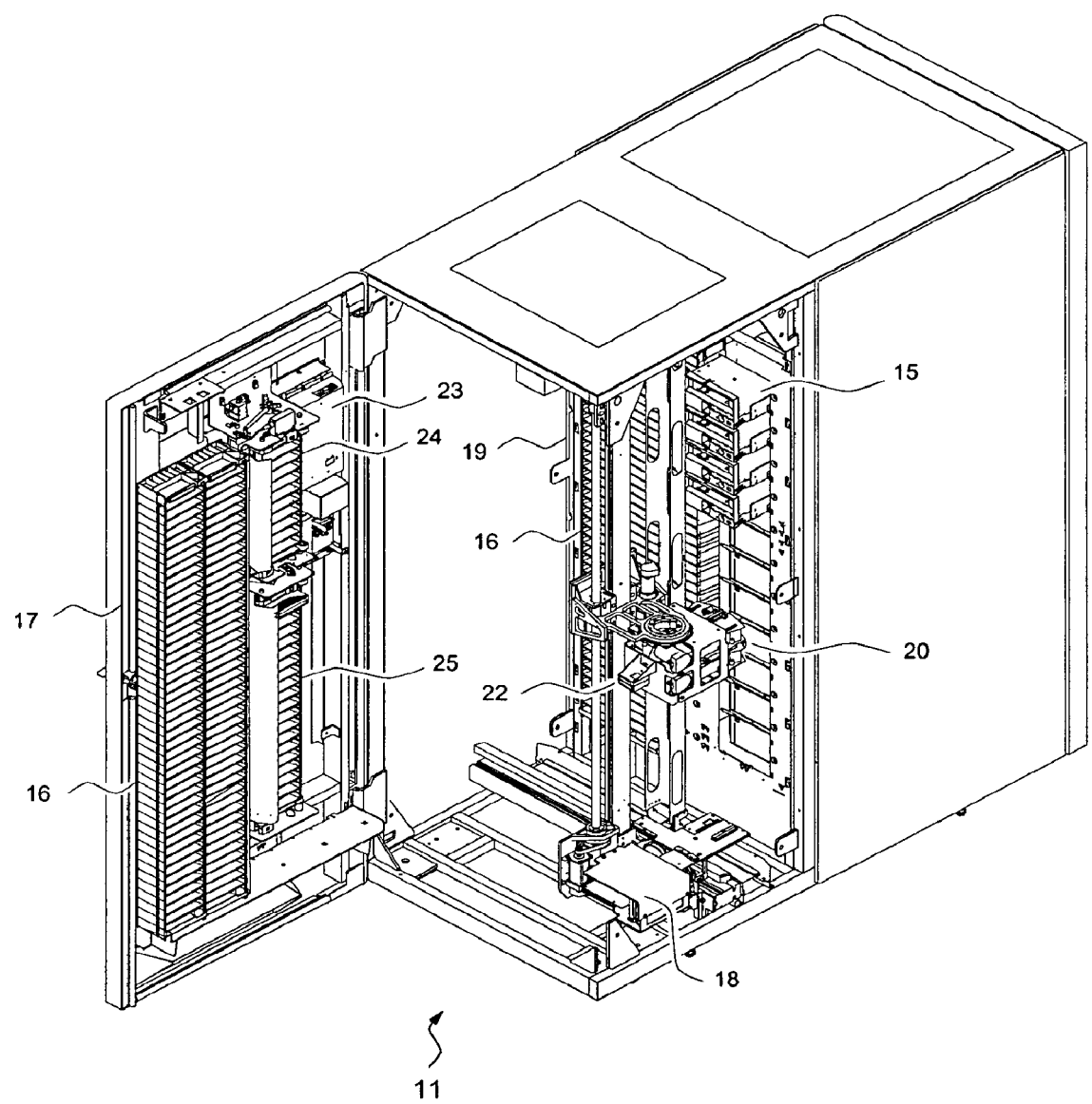
FIG. 2 illustrates an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16, one front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper assembly 20, to "read" identifying information about the data storage media.

Figure 3:
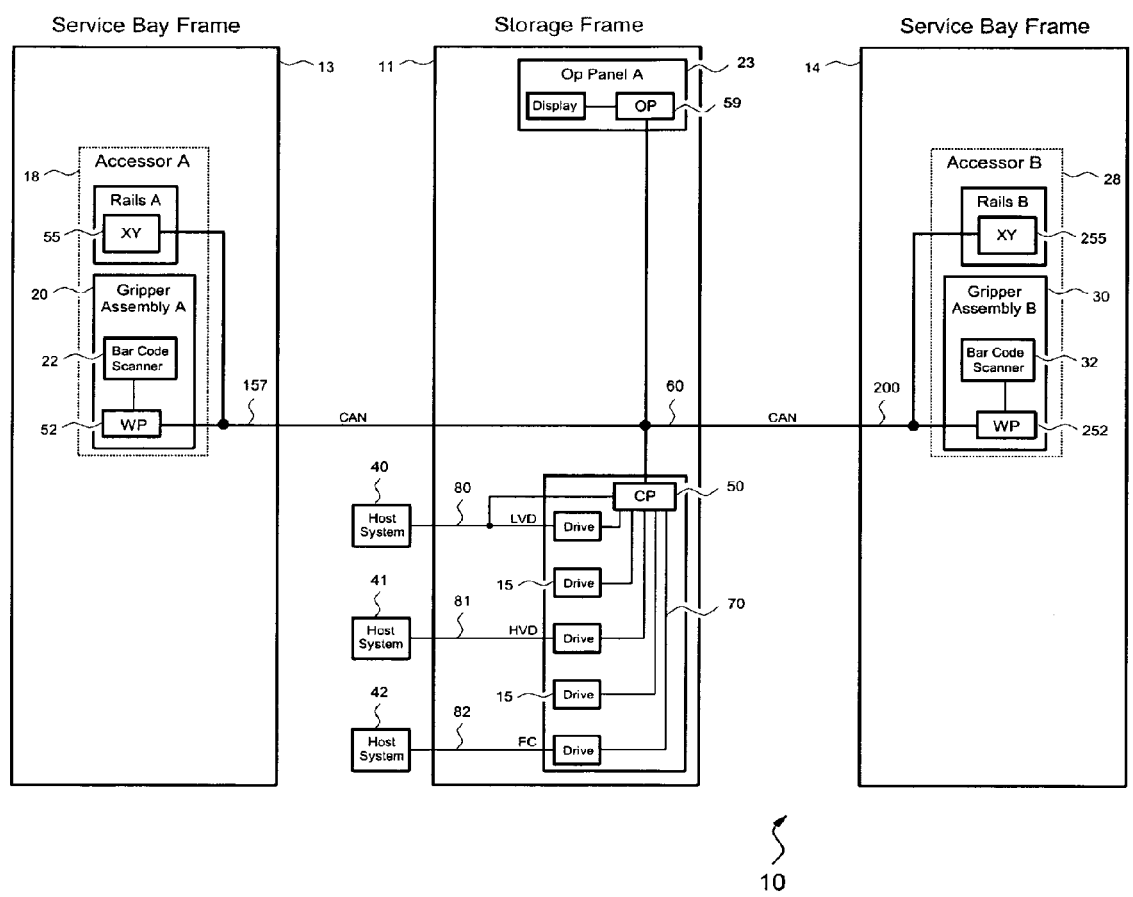
FIG. 3 illustrates a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper assembly 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
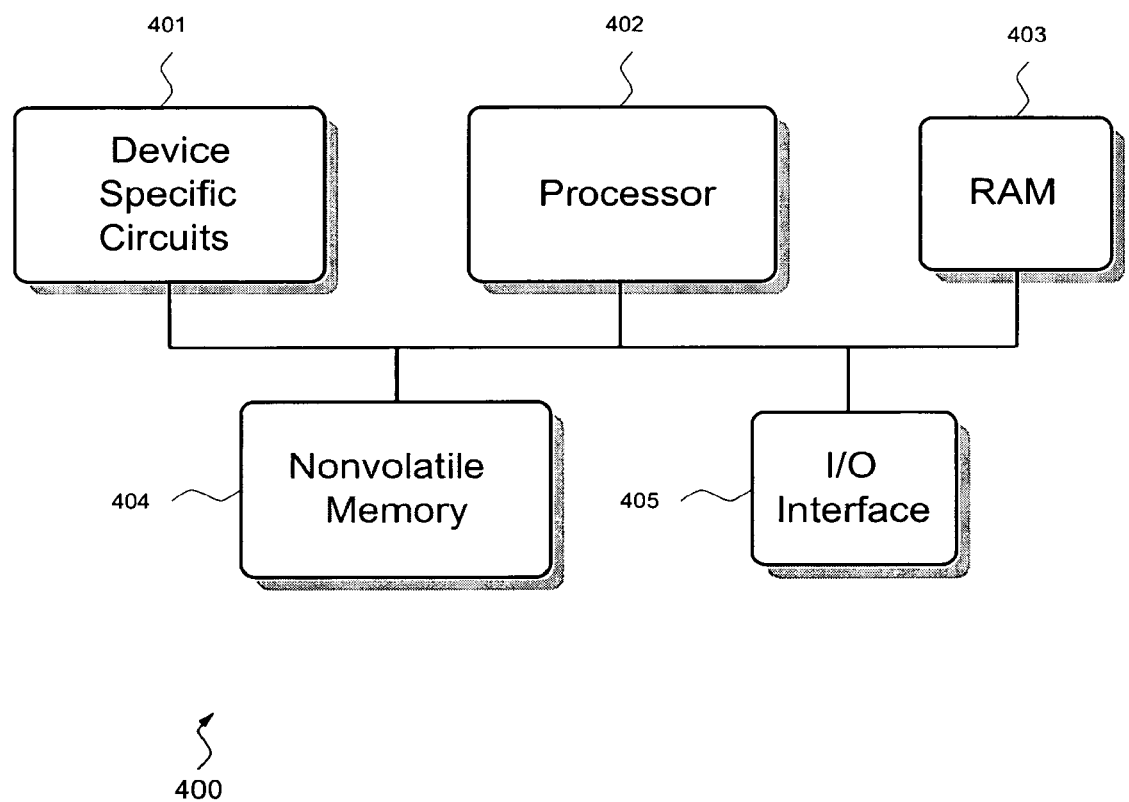
FIG. 4 illustrates a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation, etc. In another example, one of the processor nodes 50, 52, 55, 59, 252, 255 may comprise a controller. Still further, two or more of the processor nodes may comprise a controller. In this example, the controller may be distributed among the two or more processor nodes. Essentially, the term "controller" as used herein is intended in its broadest sense as a device or system that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), Fibre Channel, SCSI (Small Computer Systems Interface), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Figure 5:
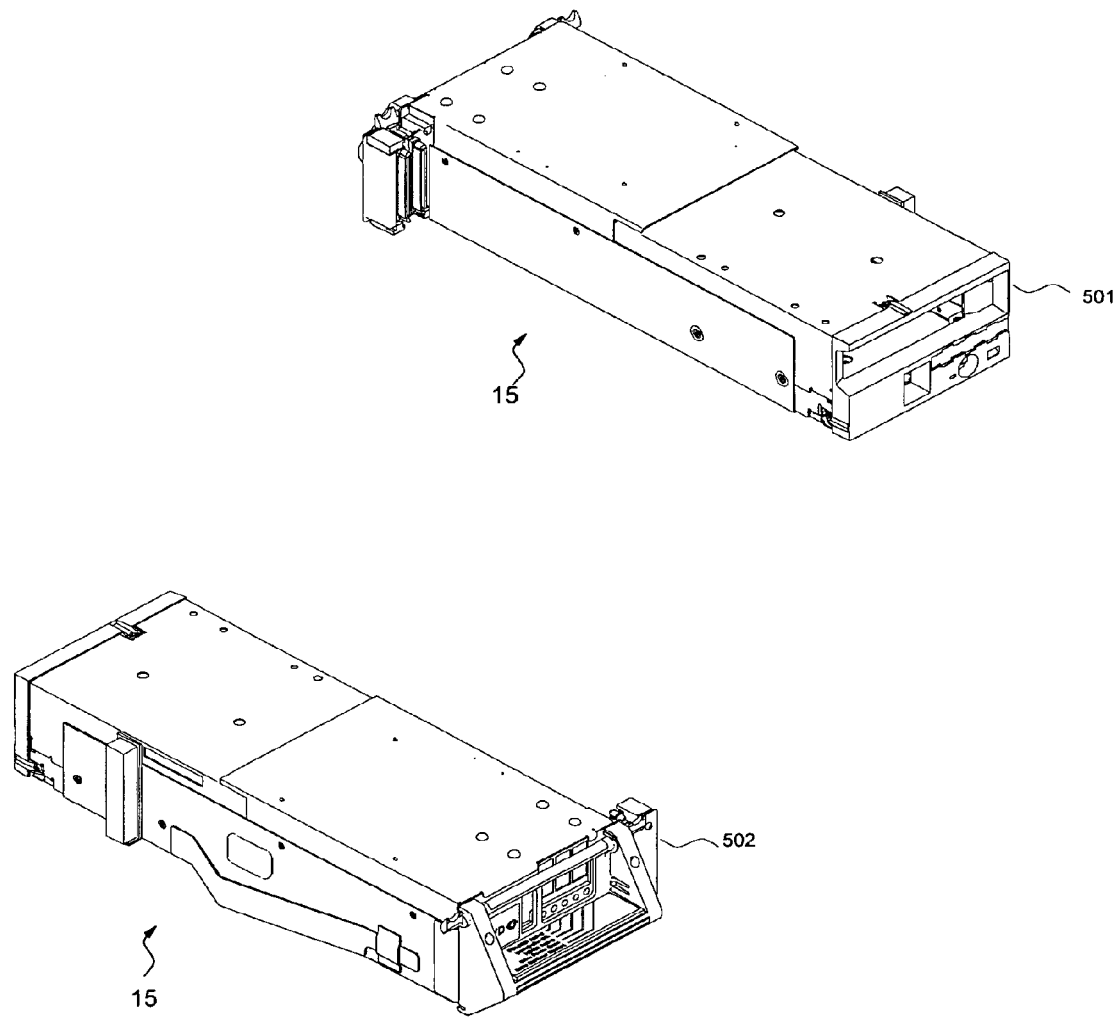
FIG. 5 illustrates an isometric view of the front and rear of a data storage drive adaptable to implement an embodiment of the present invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
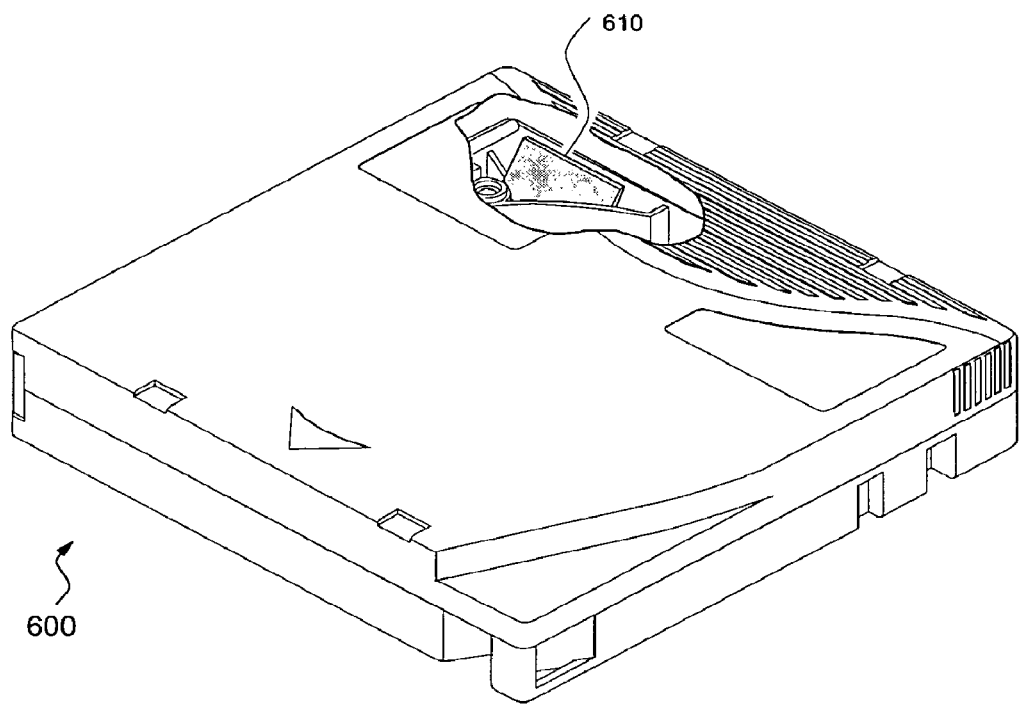
FIG. 6 illustrates an isometric view of a data storage cartridge adaptable to implement an embodiment of the present invention.

FIG. 6 illustrates an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory.

Figure 7:
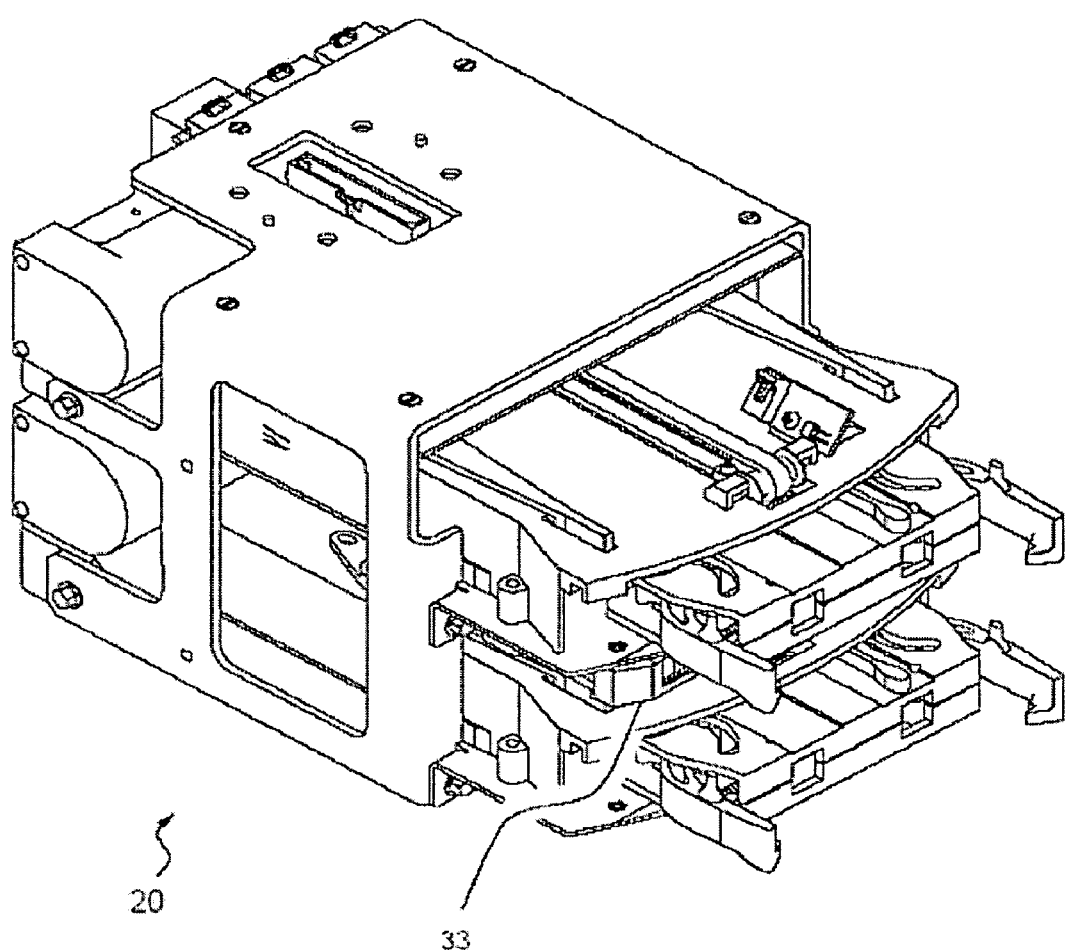
FIG. 7 illustrates an isometric view of an accessor adaptable to implement an embodiment of the present invention.

FIG. 7 illustrates an embodiment of gripper assembly 20 employing a calibration sensor 33 that is operable to emit energy (e.g., light) and to detect any reflection by an object of that energy in a direction of calibration sensor 33 whereby calibration sensor 33 outputs a sensing signal indicative of a reflectivity of the object. In a first embodiment, calibration sensor 33 outputs the sensing signal in a digital form that is indicative of a sensing of a reflection by an object of the emitted energy in a direction of calibration sensor 33 or a failure to sense a reflection by an object of the emitted energy in a direction of calibration sensor 33. In a second embodiment, calibration sensor 33 outputs the sensing signal in an analog form that is indicative of a sensing of a degree of reflection by an object of the emitted energy in a direction of calibration sensor 33 whereby an analog-to-digital converter may be employed to convert the sensing signal to digital form for further processing by a library controller.

Calibration sensor 33 may be assembled as a complete unit or components of calibration sensor 33 may distributed be among various locations on gripper assembly 20 and/or some other library component.

Figure 8:
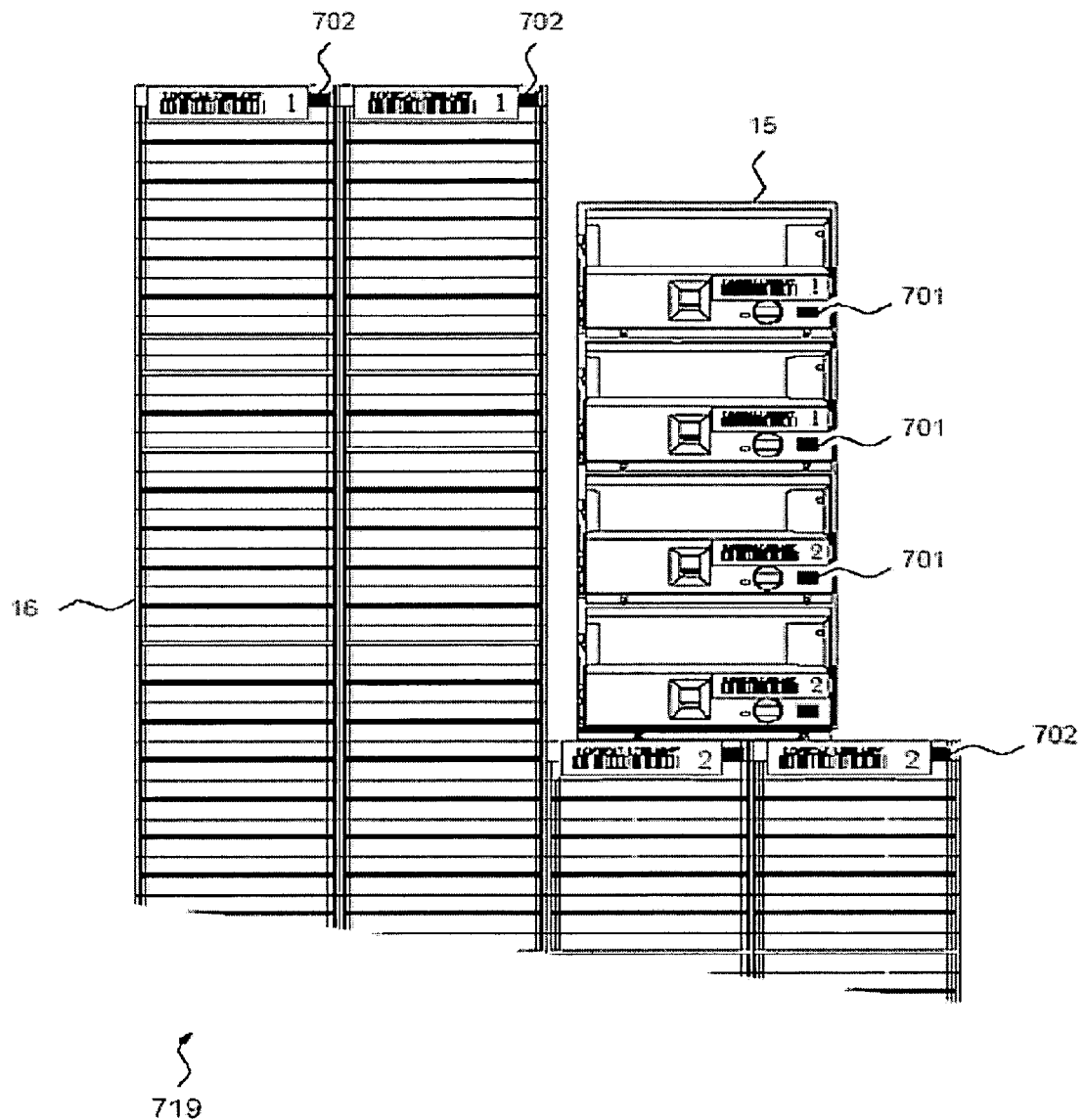
FIG. 8 illustrates a block diagram depicting an exemplary fiducial target configuration.

In operation, calibration sensor 33 is used on a moving accessor to get accurate X direction and Y direction position information based on calibration sensor 33 sensing fiducial targets placed at various locations within the library as would be appreciated by those having ordinary skill in the art, such as, for example, fiducial targets 701 located on data storage drive 15 as shown in FIG. 8, fiducial targets 702 located on storage shelves 16 as shown in FIG. 8 and fiducial targets placed on I/O workstations 24/25 (FIG. 2). In the embodiment shown in FIG. 8, fiducial targets 701 and 702 are apertures in respective data storage drives 15 and storage shelves 16 having a zero reflectivity characteristic. As such, the sensing signal outputted by calibration sensor 33 will be in digital form as an indication of a non-reflective condition (i.e., an off state) in response to calibration sensor 33 emitting energy through one of the fiducial targets 701 and 702 or an indication of a reflective condition in (i.e., an on state) in response to calibration sensor 33 emitting energy at and receiving an energy reflection from a surface of one of the data storage drives 15 and storage shelves 16.

As appreciated by those having ordinary skill in the art, an error results whenever a fiducial target 701 or a fiducial target 702 is not found via calibration sensor 33 in an expected location within the library. To better manage this type of error as compared to a camera picture of the expected location within the library, the present invention is premised on creating a calibration sensor pixel image of an expanded area surrounding the expected location of a fiducial target via calibration sensor 33 to thereby facilitate an execution of an additional calibration procedure (e.g., debugging procedure, a diagnostic test and/or an error recovery procedure) when the fiducial target can not be found at its expected location within the calibration area and/or calibration sensor 33 is not operating with an acceptable energy detection sensitivity level.

Figure 9:
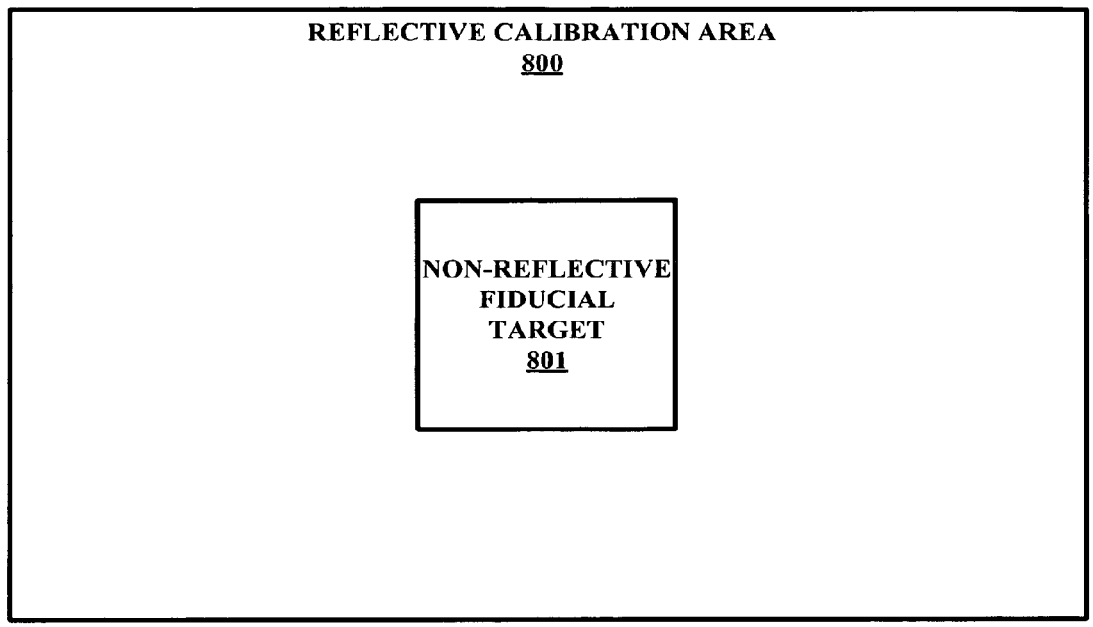
FIG. 9 illustrates a block diagram of an exemplary reflective calibration area surrounding an expected location of a non-reflective fiducial target in accordance with the present invention.
Figure 10:
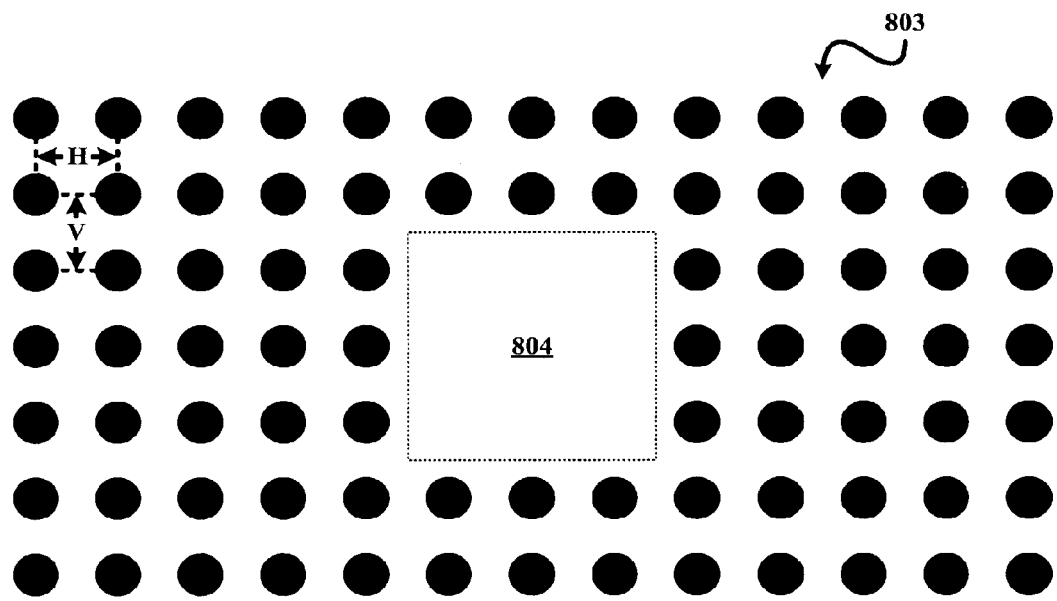
FIG. 10 illustrates a calibration sensor image of the calibration area illustrated in FIG. 9.

For example, as shown in FIG. 9, a reflective calibration area 800 surrounds an expected location of a non-reflective fiducial target 801 (e.g., fiducial targets 701 and 702 shown in FIG. 8) at a center position of calibration area 800. The reflectivity characteristics of area 800 and fiducial target 801 are different whereby a creation of an exemplary calibration sensor pixel image 803 as shown in FIG. 10 exhibits a target representation 803 of non-reflective fiducial target 801 at the center position of calibration area 800. Specifically, each pixel of image 803 has a defined position based on a fixed vertical interval V and fixed horizontal interval H between the pixels. As the image is being created by calibration sensor 33, each pixel associated with the sensing signal indicating a reflection by calibration area 800 of the energy emitted by reflective calibration sensor 33 will be displayable as a solid dot while each pixel associated with the sensing signal indicating a non-reflection by non-reflective fiducial target 801 of the energy emitted by calibration sensor 33 will be displayable as blank space.

Figure 11:
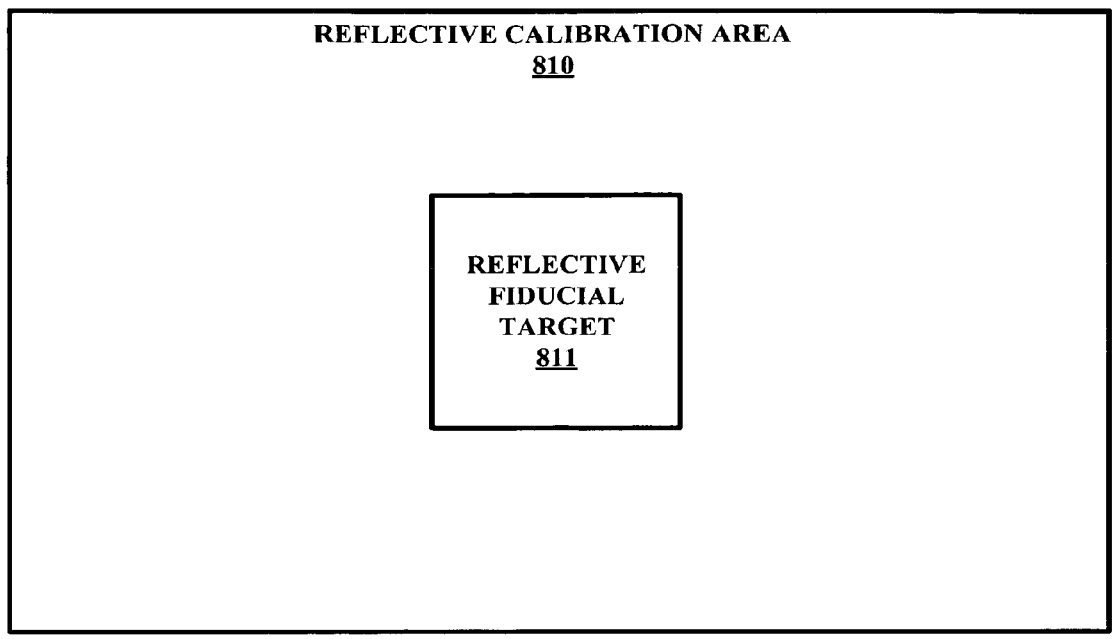
FIG. 11 illustrates a block diagram of an exemplary reflective calibration area surrounding an expected location of a reflective fiducial target in accordance with the present invention.
Figure 12:
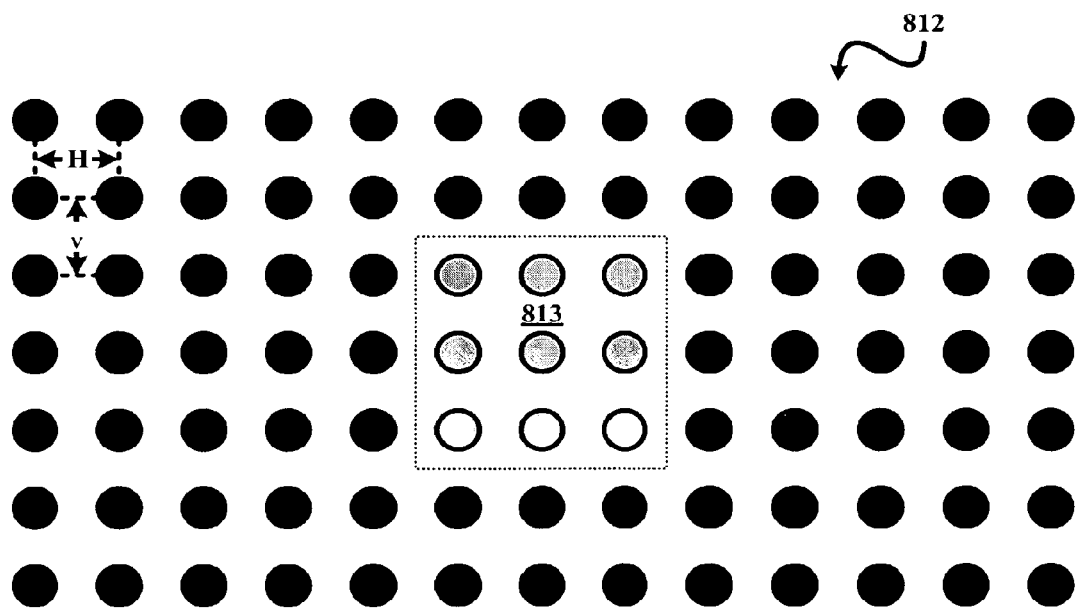
FIG. 12 illustrates a calibration sensor image of the calibration area illustrated in FIG. 11.

Also by example, as shown in FIG. 11, a reflective calibration area 810 surrounds an expected location of a reflective fiducial target 811 at a center position of calibration area 810. The reflectivity characteristics of area 810 and fiducial target 811 are different whereby a creation of an exemplary calibration sensor pixel image 812 as shown in FIG. 12 exhibits a representation 813 of reflective fiducial target 811 at the center position of calibration area 810. Specifically, each pixel of image 812 has a defined position based on a fixed vertical interval V and fixed horizontal interval H between the pixels. As the image is being created by calibration sensor 33, each pixel associated with the sensing signal indicating a reflection by calibration area 810 of the energy emitted by calibration sensor 33 will be displayable as a solid dot whereby the grey level of the dots (e.g., black as shown) represents a reflectivity characteristic of calibration area 810. Similarly, each pixel associated with the sensing signal indicating a reflection by reflective fiducial target 811 of the energy emitted by calibration sensor 33 will be displayable as a solid dot whereby the grey level of the dots (e.g., grey as shown) represents a reflectivity characteristic of fiducial target 811. In this example, a top row of target representation 813 has a darkest grey level among the rows of target representation, a middle row of target representation 813 has an intermediate grey level among the rows of target representation 813, and a bottom row of target representation 813 has a lightest grey level among the rows of target representation 813.

Figure 13:
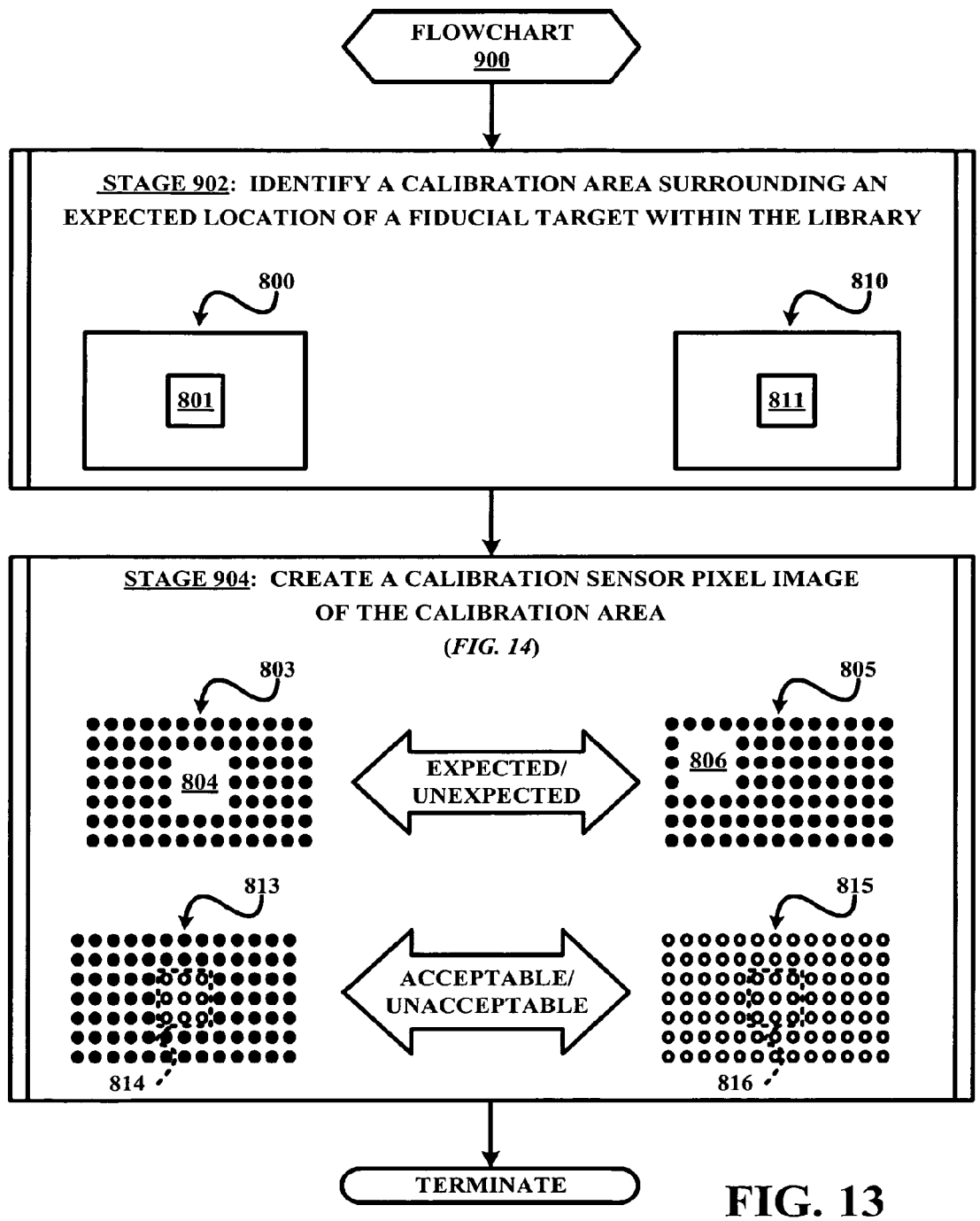
FIG. 13 illustrates a flowchart representative of a calibration sensor pixel image creation method in accordance with the present invention.

FIG. 13 illustrates a flowchart 900 representative of a calibration sensor pixel image creation method of the present invention for creating image 803 (FIG. 10), image 812 (FIG. 12) and other images within the inventive principles of the present invention. A controller of the library is structurally configured with hardware, software and/or firmware to implement flowchart 900 in response to a failure for calibration sensor 33 to find a fiducial target of the library in an expected location within the library or in response to a diagnostics testing of calibration sensor 33. As to a failure of calibration sensor 33 to find a fiducial target of the library in an expected location within the library, those having ordinary skill in the art will appreciate that such a determination is based on a fiducial target location policy of the library which defines what is and what is not considered a "finding" of the fiducial target at the expected location within the library.

For example, the fiducial target location policy of the library may only consider the fiducial target to be found at its expected location within the library if the fiducial target is entirely found at its expected location. Also by example, the fiducial target location policy of the library may only consider the fiducial target to be found at its expected location within the library if the fiducial target is a specified percentage of the fiducial target is found at or adjacent its expected location.

A stage S902 of flowchart 900 encompasses the controller identifying a calibration area surrounding an expected location of the subject fiducial target within the library, such as, for example, calibration areas 800 and 810 as shown. In one embodiment of stage S902, the controller is structurally configured to outline or to retrieve an outline of a perimeter of a box of a pre-defined width (e.g., 50 mm) and a pre-defined height (e.g., 40 mm) whose center is the expected location of the fiducial target.

A stage S904 of flowchart 900 encompasses the controller creating the calibration sensor pixel image of the calibration area identified in stage S902. In one embodiment of stage S902, the controller is structurally configured to create the image including pixels having a defined position based on a fixed vertical interval V (e.g., 2 mm) and fixed horizontal interval H (e.g., 2 mm) between the pixels. For example, the controller would create a 20×25=500 pixel monochrome image based on a perimeter of a box being a pre-defined width of 50 mm and a pre-defined height of 40 mm, and based on the fixed vertical interval V and the fixed horizontal interval H both being 2 mm.

In an error mode of stage S904, the calibration sensor pixel image being created is intended to show a non-reflective fiducial target in an unexpected location, such as, for example, a calibration sensor pixel image 805 exhibiting a target representation 806 at an unexpected location of fiducial target 801 within calibration area 800 as compared to calibration sensor pixel image 803 exhibiting a target representation 804 at an expected location of fiducial target 801 within calibration area 800.

In a diagnostics testing mode of stage S904, the calibration sensor pixel image being created is intended to show a reflective fiducial target in an expected location within an acceptable or unacceptable energy sensitivity level, such as, for example, calibration sensor pixel image 813 exhibiting target representation 814 at an expected location of fiducial target 811 within calibration area 810 with an acceptable energy sensitivity level (i.e., each pixel has a required grey level) as compared to a calibration sensor pixel image 815 exhibiting a target representation 816 at an expected location of fiducial target 811 within calibration area 810 with an unacceptable energy sensitivity level (i.e., one or more pixels fail to shown the required grey level).

In practice, the present invention does not impose any limitations or any restrictions to the manner by which stage S904 is implemented by the controller. Thus, the following description of one embodiment of stage S904 as illustrated in FIG. 14 does not limit nor restrict the scope of embodiments of stage S904.

Figure 14:
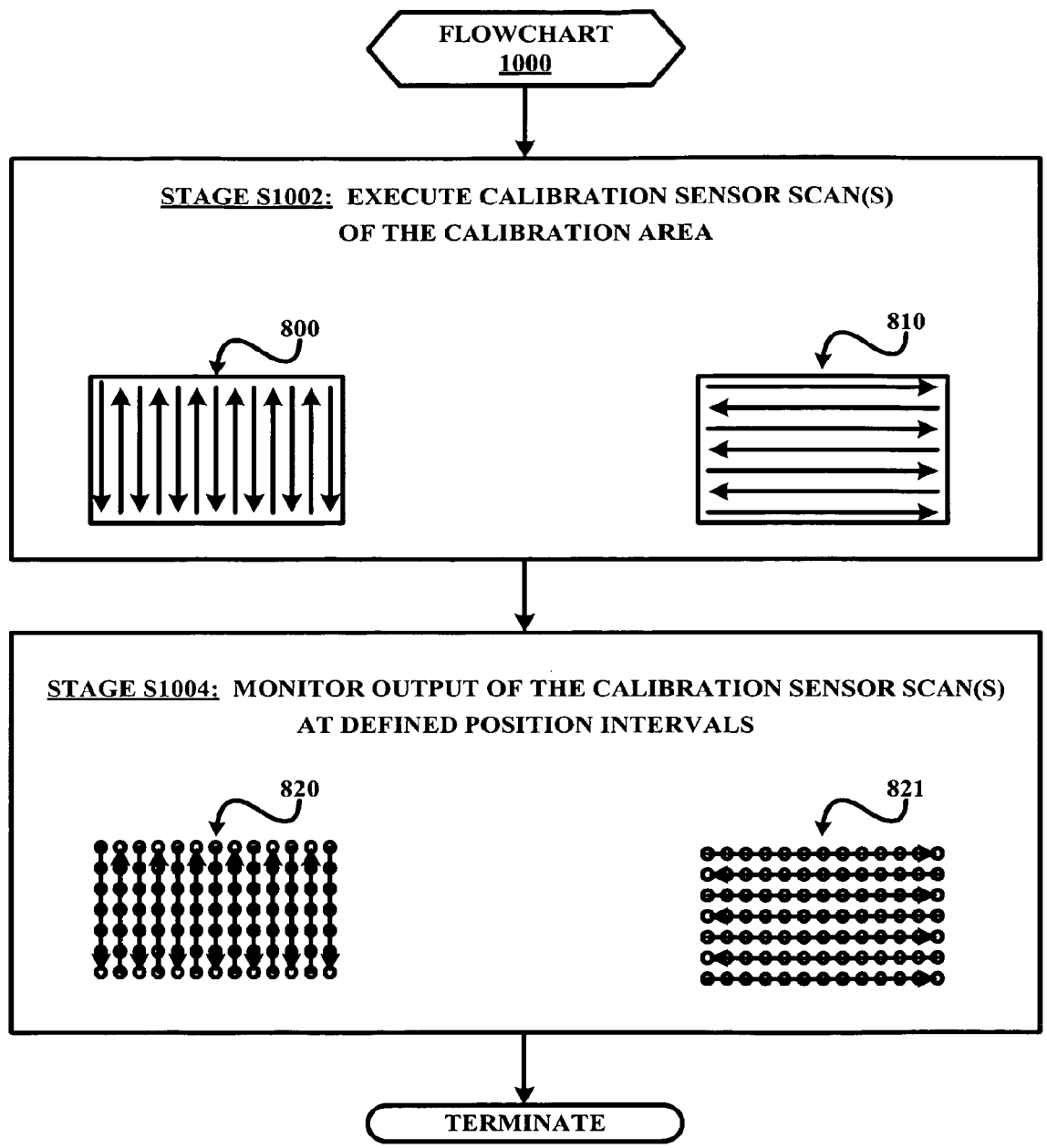
FIG. 14 illustrates a flowchart representative of a calibration sensor scanning method in accordance with the present invention.

FIG. 14 illustrates a flowchart 1000 representative of one embodiment of stage S904. A stage S1002 of flowchart 1000 encompasses the controller executing one or more calibration sensor scan(s) of the calibration area. In one embodiment of stage S1002, the controller operates calibration sensor 33 to perform vertical scans of calibration area 800 in a serpentine manner as shown. In a second embodiment of stage S1002, the controller operates calibration sensor 33 to perform horizontal scans of calibration area 810 in a serpentine manner as shown. In a third embodiment, the controller operates calibration sensor to perform vertical and horizontal scans of calibration area 800.

A stage S1004 of flowchart 1000 encompasses the controller monitoring the output of the calibration sensor scan(s) at defined position intervals. In one embodiment, the controller generates a table 820 of scan data representative of pixel data points among the defined position intervals based on the interval monitoring of the vertical scan(s) as shown. In a second embodiment, the controller generates a table 821 of scan data representative of pixel data points among the defined position intervals based on the interval monitoring of the horizontal scan(s) as shown. The scan data will represent a digital sensing or an analog sensing of the calibration area in dependence upon the type of calibration sensor 33 being employed.

Referring to FIGS. 9-14, those having ordinary skill in the art will appreciate the various benefits of creating a calibration sensor pixel image in accordance with the present invention. The following are description of exemplary calibration procedures based on a creation of a calibration sensor pixel image in accordance with the present invention.

Figure 15:
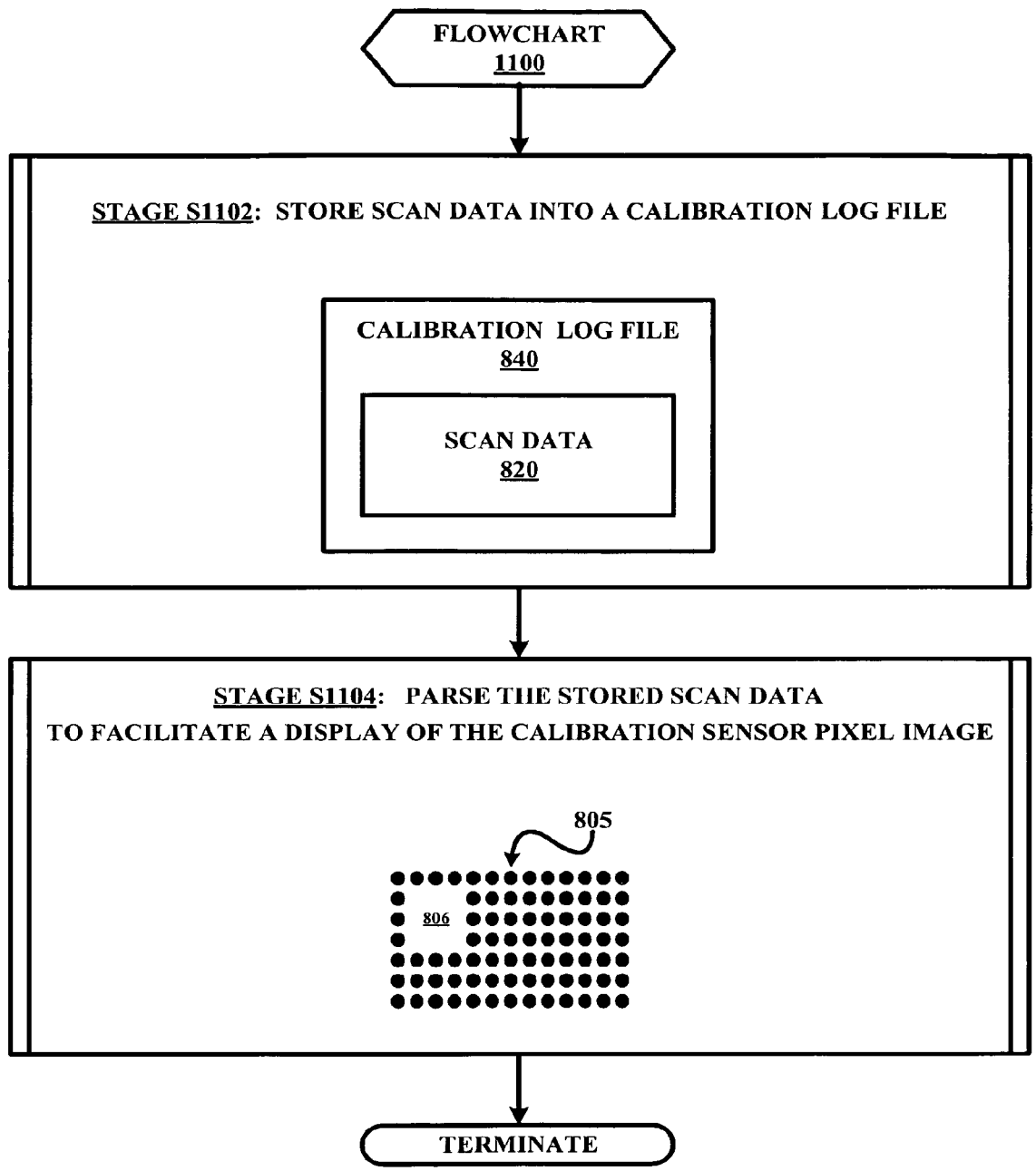
FIG. 15 illustrates a flowchart representative of a debugging procedure in accordance with the present invention.

FIG. 15 illustrates a flowchart 100 representative of an error debugging procedure of the present invention. A stage S1102 of flowchart 1100 encompasses the controller storing scan data into a calibration log file, such as, for example, the controller storing scan data 820 (FIG. 14) into a calibration log file 840. A stage S1104 of flowchart 1100 encompasses a parsing of the stored scan data to facilitate a display of the calibration sensor pixel image, such as, for example, calibration sensor pixel image 805 as shown. In one embodiment of stage S1104, the controller provides the calibration log file to a workstation or server associated with the library whereby the stored scan data can be parsed for purpose of displaying the calibration sensor pixel image during error analysis of the library.

Figure 16:
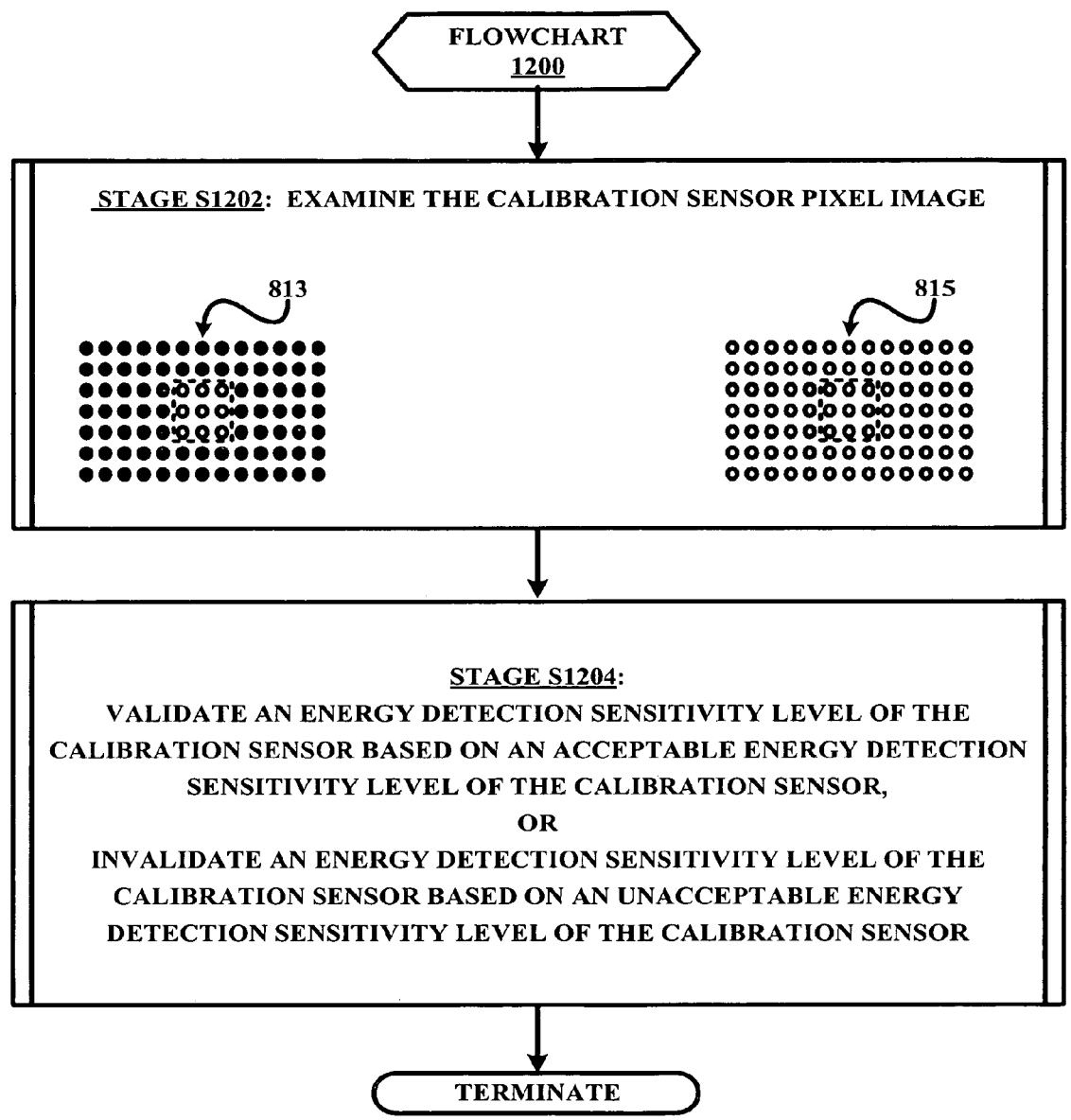
FIG. 16 illustrates a flowchart representative of a diagnostic testing method in accordance with the present invention.

FIG. 16 illustrates a flowchart 1200 representative of a diagnostic testing of the present invention. A stage S1202 of flowchart 1200 encompasses an examination of the calibration sensor pixel image, such as, for example, calibration sensor pixel image 815. In one embodiment of stage S1202, the calibration sensor pixel image is compared, visually or electronically, to a baseline calibration sensor pixel image exhibiting an acceptable energy detection sensitivity level of calibration sensor 33, such as, for example, baseline calibration sensor pixel image 813 as shown. If the grey levels of both images are identical or substantially identical in accordance with a calibration policy, then the energy detection sensitivity level of calibration sensor 33 is deemed valid during a stage S1204 of flowchart 1200. Otherwise, the energy detection sensitivity level of calibration sensor 33 is deemed invalid during a stage S1204 whereby the calibration sensor can be adjusted, repaired or replaced.

Figure 17:
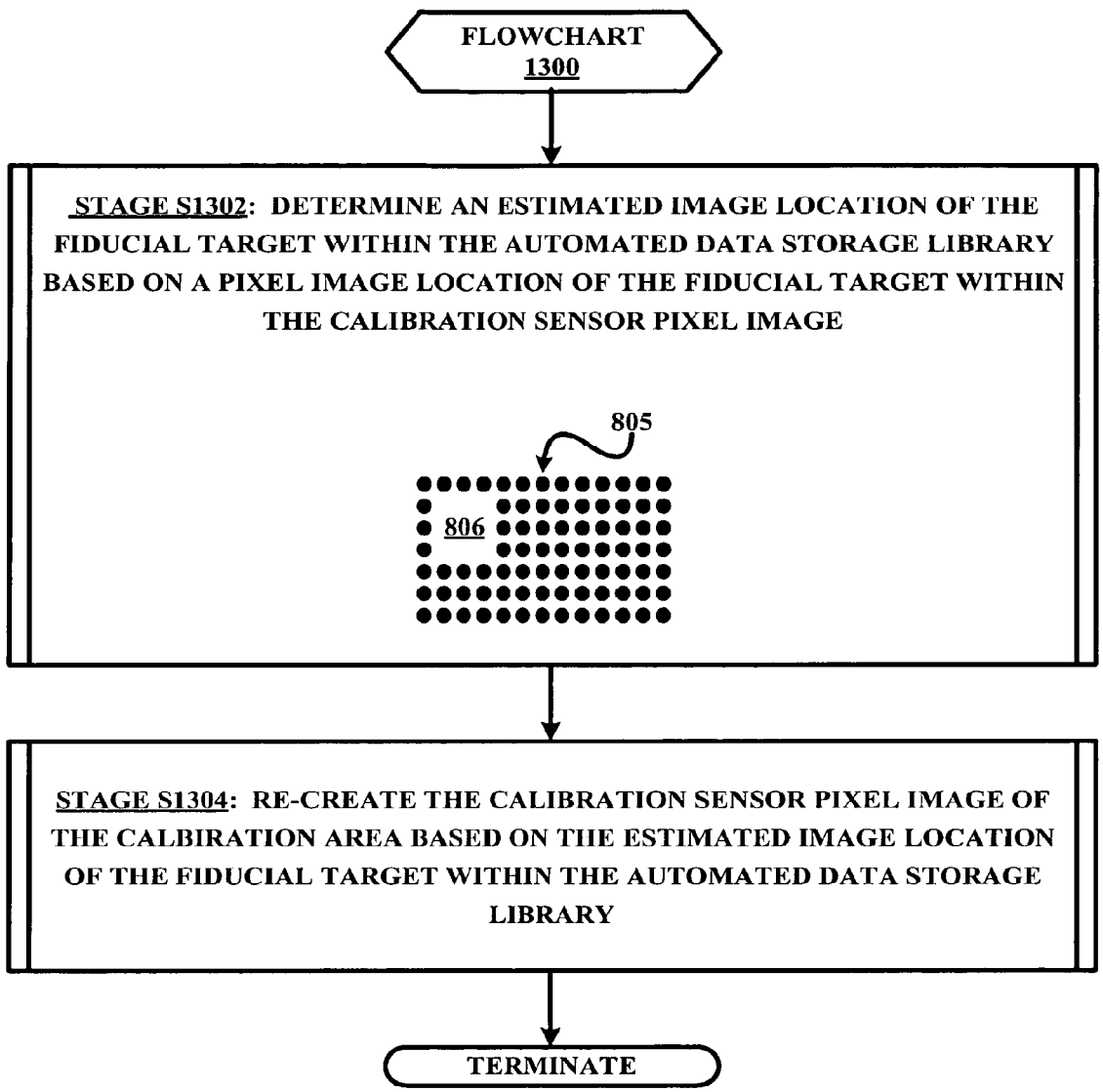
FIG. 17 illustrates a flowchart representative of an error recovery procedure in accordance with the present invention.

FIG. 17 illustrates a flowchart 1300 representative of an error recovery procedure of the present invention. A stage S1302 of flowchart 1300 encompasses the controller determining an estimated image location of the fiducial target within the library based on a pixel image location of the fiducial target within the calibration sensor pixel image, such as, for example, a pixel image location 806 of the fiducial target within calibration sensor pixel image 805 as shown. Based on the an estimated image location of the fiducial target within the library, the controller re-creates the calibration sensor pixel image of the calibration area in accordance with flowchart 900 (FIG. 13) to thereby either locate the fiducial target at the estimated image location whereby the controller thereafter uses the estimated image location in the library as the new expected location of the fiducial target in the library or whereby the controller will repeat flowcharts 900 and 1300 one or more time in accordance with a calibration policy.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A computer readable medium device having code executed by a processor to calibrate an accessor and perform operations, the operation comprising:
   receiving a sensing signal outputted by an output device responsive to emitted energy and a detected reflection from a calibration sensor, wherein the calibration sensor is operable to emit the energy and detect reflection of the emitted energy; and
   constructing a pixel map based on the output sensing signal, the pixel map based on the detection of reflection of the emitted energy wherein the sensing signal is in a digital form as an indication of a non-reflective condition in response to the calibration sensor emitting energy without detecting a reflection of the emitted energy and as an indication of a reflective condition in response to the calibration sensor emitting energy and detecting a reflection of the emitted energy.

2. A computer readable medium device having code executed by a processor to calibrate an accessor and perform operations, the operation comprising:
   receiving a sensing signal outputted by an output device responsive to emitted energy and a detected reflection from a calibration sensor, wherein the calibration sensor is operable to emit the energy and detect reflection of the emitted energy; and
   constructing a pixel map based on the output sensing signal, the pixel map based on the detection of reflection of the emitted energy wherein the pixel map includes a reflective calibration area surrounding an expected location of a fiducial target, and wherein the fiducial target includes a reflectivity characteristic different than a reflectivity characteristic of a data storage device, such that the pixel map exhibits a target representation of a fiducial target at a center position of the calibration area such that each pixel of the pixel map has a defined position based on a fixed vertical interval and a fixed horizontal interval between the pixels, such that a solid dot pixel is associated with the sensing signal indicating a detected reflection is represented by a solid dot and a blank space pixel is associated with the sensing signal indicating an undetected reflection.

3. The computer readable medium of claim 2, wherein there are a plurality of fiducial targets formed in a data storage device, wherein the accessor is configured to access the data storage device, and wherein the fiducial targets are configured to reflect the energy emitted by the calibration sensor and wherein the sensing signal is in a digital form as an indication of a non-reflective condition in response to the calibration sensor emitting energy without detecting a reflection of the emitted energy and as an indication of a reflective condition in response to the calibration sensor emitting energy and detecting a reflection of the emitted energy.

4. A method for calibrating an accessor, comprising:
   receiving a sensing signal outputted by an output device responsive to emitted energy and a detected reflection from a calibration sensor, wherein the calibration sensor is operable to emit the energy and detect reflection of the emitted energy; and
   constructing a pixel map based on the output sensing signal, the pixel map based on the detection of reflection of the emitted energy wherein the sensing signal is in a digital form as an indication of a non-reflective condition in response to the calibration sensor emitting energy without detecting a reflection of the emitted energy and as an indication of a reflective condition in response to the calibration sensor emitting energy and detecting a reflection of the emitted energy.

5. A method for calibrating an accessor, comprising:
   receiving a sensing signal outputted by an output device responsive to emitted energy and a detected reflection from a calibration sensor, wherein the calibration sensor is operable to emit the energy and detect reflection of the emitted energy; and
   constructing a pixel map based on the output sensing signal, the pixel map based on the detection of reflection of the emitted energy wherein the pixel map includes a reflective calibration area surrounding an expected location of a fiducial target, and wherein the fiducial target includes a reflectivity characteristic different than a reflectivity characteristic of a data storage device, such that the pixel map exhibits a target representation of a fiducial target at a center position of the calibration area such that each pixel of the pixel map has a defined position based on a fixed vertical interval and a fixed horizontal interval between the pixels, such that a solid dot pixel is associated with the sensing signal indicating a detected reflection is represented by a solid dot and a blank space pixel is associated with the sensing signal indicating an undetected reflection.

6. The method of claim 5, wherein there are a plurality of fiducial targets formed in a data storage device, wherein the accessor is configured to access the data storage device, and wherein the fiducial targets are configured to reflect the energy emitted by the calibration sensor and wherein the sensing signal is in a digital form as an indication of a non-reflective condition in response to the calibration sensor emitting energy without detecting a reflection of the emitted energy and as an indication of a reflective condition in response to the calibration sensor emitting energy and detecting a reflection of the emitted energy.

* * * * *